United States Patent Office 3,326,508
Patented June 20, 1967

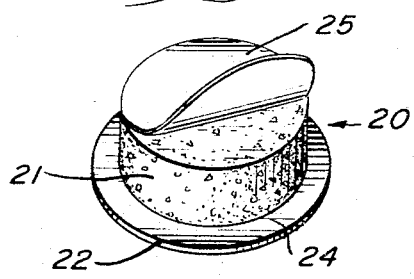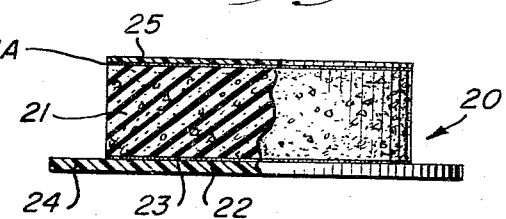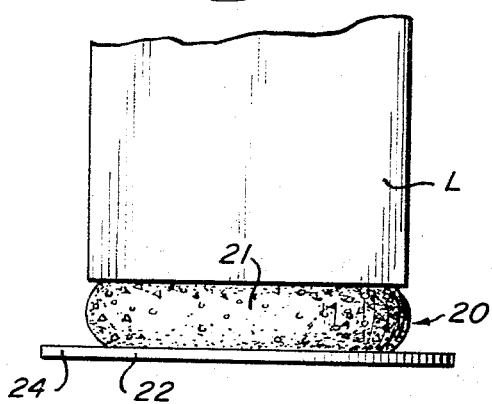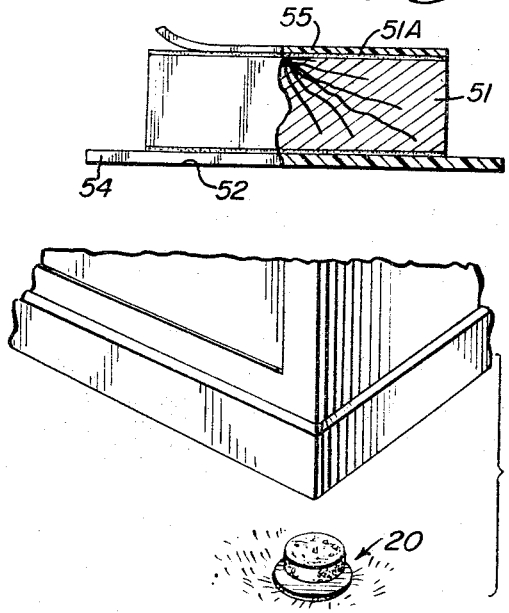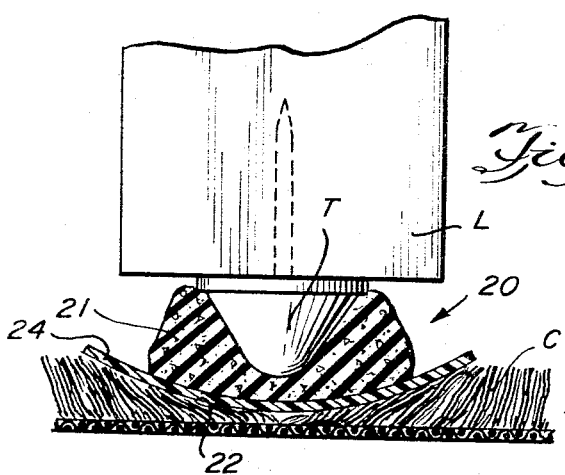

3,326,508
SLIDABLE CASTER
Robert E. Born, Broadview, Ill., assignor to
Born Manufacturing Co.
Filed Oct. 21, 1965, Ser. No. 499,471
10 Claims. (Cl. 248—346.1)

ABSTRACT OF THE DISCLOSURE

A slide caster comprising a laminar assembly of an adapter body to engage a structure to be supported and a flexible slide shoe of Teflon sheet stock underlying the body and projecting therebeyond to present a flexible marginal lip. The body has adhesive securement to the shoe and has adhesive on its upper face to contact the supported structure. The body is of sponge rubber so that the caster is bodily resiliently flexible.

This invention relates to slidable casters and more particularly is concerned with a quick-fit insert type of slidable caster for use with various types of heavy or hard to move bulky structures including furniture of all kinds, refrigerators, ranges, tables, desks and televisions.

The structures of interest may have support legs of flat, pointed, tipped or recessed configuration or may be legless base-supported types. In many instances involving items such as refrigerators or ranges, the structures are hardly ever moved, except during major cleaning and decorating operations, due primarily to the extreme difficulty in sliding the same and due to the floor damage incident to sliding such heavy structures.

Where these heavy structures are positioned on linoleum or asphalt tile floors or directly on finished wood floors, sliding movements are invariably damaging to the floor finish, and where these structures are positioned on carpeting, sliding movements, if not impossible, can tear or otherwise damage the carpet material.

The present invention provides a slidable caster construction that eliminates the foregoing problems. In one form, a slidable caster is provided which is universal in its application in that it is smoothly slidable on all ordinary floor surfaces and coverings and it is insertable in stable relation beneath supports and legs of all types and configurations. This universal form of caster consists of a flexible shoe of lubric plastic material and a conformable adapter body seated centrally on the shoe to receive the floor contact section of the structure. The margin of the shoe extends beyond the adapter body to serve as a lip capable of flexing to ride over any minor floor irregularities and capable of shielding the body from floor contact when it undergoes distortion and lateral flow under heavy loading.

The shoe is constructed of lubric plastic to present an anti-friction slide face on its underside and to present a grippable treated upper face for receiving the conformable adapter body. The adapter body is of soft sponge rubber and is fixed by adhesive to the upper face of the shoe.

The sponge rubber adapter body easily conforms to the contour of the floor contact portion which it supports and where a set of casters jointly support a structure the sponge rubber body acts to level out or balance any height irregularities in the support legs or other base contact portions.

Another embodiment of slide caster is disclosed having a flexible shoe equipped with a rigid contact block that is provided with a pressure sensitive adhesive coating.

Other features and advantages of the invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of the specification, and in which like numerals are employed to designate like parts throughout the same, FIG. 1 is a perspective view of one embodiment of slidable caster;

FIG. 2 is a side view partly in section and partly in elevation further illustrating the caster of FIG. 1;

FIG. 3 is an enlarged fragmentary elevational view illustrating the caster in load supporting position beneath a flat faced support leg;

FIG. 4 is a side view illustrating the caster in section and positioned upon carpeting to support a tipped support leg;

FIG. 5 is a perspective view of the caster being positioned beneath the corner of a base supported type of structure; and FIG. 6 is a side view partly in elevation and partly in section illustrating still another embodiment of a slidable caster.

Referring now to the drawings, a universal type of slide caster and its application is illustrated in FIGS. 1–5 whereas another type of custom mounted slide caster is illustrated in FIG. 6.

The illustrated embodiment of a universal slide caster is designated generally at 20. Its construction enables its insertion beneath various types of bulky structures to enable easy sliding movement of these structures along a floor surface. In FIGURE 3 the caster 20 is shown positioned beneath a flat ended wooden support leg L such as may commonly be found on tables, desks, televisions and upholstered furniture of all types. In this particular installation the caster is understood to be riding upon hard surfaced flooring such as is presented by a bare wood floor, linoleum, ceramic tile or asphalt or vinyl tile and similar current types of floor coverings.

The universal caster is represented in FIG. 4 inserted beneath a wooden leg L which has a rounded tip T serving as its contact foot. The caster is shown riding on carpeting C.

Another typical application for the universal caster is illustrated in FIG. 5, wherein a corner of a base mounted structure such as a dresser, a chest of drawers, a washing machine, a dryer, a range or the like is shown ready to seat on top of the caster, which has been appropriately positioned upon a support floor.

It will be apparent from the foregoing that a universal caster for bulky structures must be capable of receiving various types of floor contact portions of these structures. For this purpose the disclosed embodiment of universal caster consists of an adapter body 21 and a slide shoe 22 that carries the adapter body. The adapter body 21 is conformable to the size and shape of the floor contact portion of the bulky structure and it must be capable of establishing and maintaining anti-slide engagement in relation to the floor contact portion of the structure. The slide shoe 22 is of a lubric plastic material to be smoothly slidable on all ordinary floor surfaces, and it underlies and is mechanically engaged in anti-slide relation to the adapter body 21 so that the shoe constitutes the sole floor engaging portion of the caster.

In the universal caster embodiment the adapter body 21 is fixed by adhesive 23 (FIG. 2) on a central region of the shoe 22 and the shoe is thin-walled and extends beyond the adapted body to present a flexible circumambient marginal lip 24 capable of riding over floor surface irregularities. The shoe 22 may be flat as represented in FIGS. 1, 2 and 3 as the flexible action of the lip enables it to ride over the usual irregularities, or it may be dished as represented in FIG. 4 to enhance further its ability to ride over these irregularities. It should also be noted that where the caster is to be installed on carpeting as pictured in FIG. 4 the shoe 22 can be formed flat initially as a sustained loading against carpeting causes it to take on a dished shape because the adapted body concentrates the loading to the center of the shoe and this in turn flexes the lip in an upwardly and outwardly inclined relationship. The dished shape taken on by the shoe 22 is accentuated where the adapter body 21 receives a contact tip T such as is illustrated in FIG. 4, but the effect is present even with a flat faced leg.

In the usual installation the universal caster of this invention is essentially out of view and unnoticeable. The conformable adapter body establishes intimate mechanical engagement with the floor contact portion of the structure involved merely in response to the high pressure loading applied on the body by virtue of the weight of the structure. There is a further advantage where the structure may have legs or other floor contact portions exhibiting unbalanced height relationships, in that the adapted body under the longest leg will compress more than the adapted body under the shortest leg and thereby contribute an automatic leveling action so that the casters stabilize the structure as well as enabling easy sliding movement thereof.

While the character of the adapter body enables it to grip nearly any kind of leg or contact structure, there is advantage in providing a deposit of pressure sensitive adhesive 21A on the upper face of the body and covered by a peel off mask 25. The adhesive 21A improves the grip between the adapted body and the support and it facilitates mounting of the caster by enabling it to be adhered on the support while the same is elevated.

Where the caster is to be applied on carpeting it is more desirable that the adapter body be fixed in its inserted position beneath the floor contact portion by means of adhesive.

In one particular construction, the shoe 22 is a circular disc of lubric plastic sheeting such as Du Pont Teflon of .030 inch thickness and of 1½ inch diameter. The adapter body 21 is of soft or medium soft sponge rubber and is in the form of a cylinder ⅜ inch high and 1⅛ inches in diameter. The sponge rubber is preferably stamped from preformed sheeting and while the main body is porous the upper and lower body faces are continuous and unbroken and hence readily able to be adhered as desired. Teflon of the specified thickness is available in sheet stock and discs of circular shape may be stamped directly from this stock. The Teflon sheeting has an etched surface on one side to serve as the top face of the shoe and enable the adapter body to be fixed thereon by adhesive. Other elastomeric materials such as neoprene can be employed for the adapter body. In the disclosed embodiment, this body 21 exhibits a compression ratio of about three or four to one to enable the desired conformity to be achieved. Thus, the caster is compressible vertically to a height less than ⅓ of its free height.

A number of features inherent in the particular construction described herein for a universal slide caster may be noted. The caster is a laminar assembly of the adapter body 21 and the shoe 22. Due to the soft resiliently compressible character of the adapter body and the flexibility of the sheet stock, this laminar assembly is bodily flexible, thus enabling either the body to conform to the floor contact portion which is to be engaged or the shoe to conform to the floor surface or enabling both the shoe and the body to conform in different ways at the same time.

Where floor marking is not a problem the shoe 22 may be of nylon or of other lubric plastic material, but Teflon being softer has the advantage of avoiding marring of the floor surface.

A custom fitted slide caster embodiment is illustrated generally at 50 in FIG. 8 wherein the adapter body 51 is in the form of a rigid block of wood having its upper face provided with a coating of pressure sensitive adhesive 51A and normally covered by a peel-off mask 55. In this arrangement the block 51 is fixed centrally upon a shoe 52 stamped from flexible Teflon sheeting, with the shoe having a circumambient flexible marginal lip 54 projecting beyond the wood block.

Thus, while preferred constructional features of the invention are embodied in the structure illustrated herein, it is to be understood that changes and variations may be made by those skilled in the art without departing from the spirit and scope of the appended claims.

What is claimed is:

1. A slidable caster for insertion beneath a floor contact portion of a bulky structure to enable easy sliding movement of the structure along a floor surface, said caster comprising an adapter body to support the floor contact portion of the structure in antislide engagement, said body being a rigid block having an upper face covered with pressure sensitive adhesive, and a slide shoe underlying said body, said shoe being of Teflon sheet stock having an etched upper face secured by adhesive to said block, said shoe having a smooth under face of lubric plastic material for antifriction sliding movement during high pressure loading against such floor surface and having a circumambient marginal lip portion flexible to ride over floor surface irregularities.

2. A slidable caster for insertion beneath a floor contact portion of a bulky structure to enable easy sliding movement of the structure along a floor surface, said caster comprising an adapter body to support the floor contact portion of the structure in antislide engagement, said body being a rigid block having an upper face covered with pressure sensitive adhesive, and a slide shoe underlying said body, said shoe being of flexible sheet stock having an upper face secured by adhesive to said block, said shoe having a smooth under face of lubric plastic material for anti-friction sliding movement during high pressure loading against such floor surface and having a circumambient marginal lip portion flexible to ride over floor surface irregularities.

3. A slidable caster for insertion beneath a floor contact portion of a bulky structure to enable easy sliding movement of the structure along a floor surface and comprising a slide shoe having a smooth under face of lubric plastic material for antifriction sliding movement during high pressure loading against such floor surface, a separate adaptor body of soft resiliently compressible material seated upon and overlying only a central upper face portion of said shoe, and adhesive joining said body and said shoe in fixed centered relationship, said shoe having a flexible marginal lip portion capable of riding over floor surface irregularities, said adaptor body having a coating of pressure sensitive adhesive on a surface of said body that is to contact such floor contact portion and said adaptor body being conformable to the contour of the floor contact portion of the structure by undergoing vertical and transverse flow, with transversely flowing portions of said adaptor body being shielded from contact with the floor surface by said flexible marginal lip portion of the shoe.

4. A universal slide caster for insertion beneath a floor contact portion of a bulky structure to enable easy sliding movement of the structure along a floor surface, said caster being a composite laminar assembly that is bodily resiliently flexible to be comformable to the contour of the floor contact portion and to the floor surface, said laminar assembly comprising an adaptor body of soft resiliently compressible material for receiving the floor contact portion of the structure in comfortable antislide engagement, said body being of substantially greater transverse dimension than vertical dimension, and a flexible slide shoe having a central portion underlying the entirety of said body and secured in unitary face to face relation thereto and having a circumambient marginal lip portion projecting beyond said body to prevent floor contact of said body during vertical compression thereof, said slide shoe having a smooth under face of lubric plastic material.

5. A slide caster in accordance with claim 4 and wherein said shoe is of normally flat uniform thickness thin-walled flexible sheet stock.

6. A slide caster in accordance with claim 4 and wherein said body is compressible vertically to a height less than ⅓ of its free height.

7. A slide caster in accordance with claim 4 and wherein said caster has adhesive between said shoe and said body to join the same in unitary face to face relationship.

8. A universal slide caster for insertion beneath a floor contact portion of a bulky structure to enable easy sliding movement of the structure along a floor surface, said caster being a composite laminar assembly that is bodily resiliently flexible to be conformable to the contour of the floor contact portion and to the floor surface, said laminar assembly comprising an adaptor body of soft resiliently compressible material like sponge rubber for receiving the floor contact portion of the structure in conformable antislide engagement, said body being of substantially greater transverse dimension than vertical dimension, said body being of sponge rubber and being compressible vertically to a height less than ⅓ of its free height, and a flexible slide shoe underlying the entirety of said body and secured in unitary face to face relation thereto, said slide shoe having a smooth under face of lubric plastic material.

9. A universal slide caster for insertion beneath a floor contact portion of a bulky structure to enable easy sliding movement of the structure along a floor surface, said caster being a composite laminar assembly that is bodily flexible to be conformable to the contour of the floor contact portion and to the floor surface, said laminar assembly comprising an adaptor body of soft resiliently compressible material like sponge rubber for receiving the floor contact portion of the structure in conformable antislide engagement, said body being of substantially greater transverse dimension than vertical dimension, said body being compressible vertically to a height less than ⅓ of its free height, and a flexible slide shoe underlying the entirety of said body and secured in unitary face to face relation thereto, said slide shoe having a smooth under face of lubric plastic material, said shoe being of uniform thickness thin-walled flexible sheet stock and including a marginal portion projecting beyond said body to prevent floor contact of said body during vertical compression thereof.

10. A slide caster in accordance with claim 9 and wherein said caster has adhesive between said shoe and said body to join the same in unitary face to face relationship.

References Cited

UNITED STATES PATENTS

| | | | |
|---|---|---|---|
| 1,069,141 | 8/1913 | Jones | 248—346.1 |
| 2,317,080 | 4/1943 | Phillips | 258—346.1 |
| 2,787,085 | 4/1957 | Auer | 248—346.1 |
| 2,996,753 | 8/1961 | Kramcsak | 16—42 |
| 3,177,518 | 4/1965 | Bergstrom | 16—42 |

JOHN PETO, *Primary Examiner.*